United States Patent [19]
Rudolf et al.

[11] Patent Number: 5,200,085
[45] Date of Patent: Apr. 6, 1993

[54] PROCESS AND APPARATUS FOR EXTRACTION OF SOLID MATTER CONTAINING FAT AND/OR PROTEIN FROM SLUDGE

[75] Inventors: Péter Rudolf; Béla Szabó, both of Budapest; Ferenc Jankó, Gyór; Erzsébet Neszmélyi, Budapest; János Illés, Budapest; István Takács, Budapest; Ferenc Havas, Kapuvár; György Bende, Budapest, all of Hungary

[73] Assignee: Richter Gedeon Vegyeszeti Gyar Rt., Hungary

[21] Appl. No.: 679,059
[22] PCT Filed: Sep. 3, 1990
[86] PCT No.: PCT/HU90/00063
§ 371 Date: May 3, 1991
§ 102(e) Date: May 3, 1991
[87] PCT Pub. No.: WO91/03305
PCT Pub. Date: Mar. 21, 1991

[30] Foreign Application Priority Data
Sep. 5, 1989 [HU] Hungary .................... 4567/89

[51] Int. Cl.$^5$ .................................... C02F 11/12
[52] U.S. Cl. .................................... 210/703; 210/710; 210/712; 210/718; 210/737; 210/771; 210/774; 210/737; 210/177; 210/181; 210/197; 210/182; 210/905; 426/657; 530/412; 530/427
[58] Field of Search ............................ 210/703-705, 210/710, 712, 718, 737, 770, 771, 774, 177, 180, 181, 905, 197, 787, 182, 512.1; 530/412, 427; 426/656, 657

[56] References Cited
U.S. PATENT DOCUMENTS

| | | |
|---|---|---|
| 2,277,718 | 3/1942 | Sanders .................... 210/737 |
| 2,328,361 | 8/1943 | Sanders .................... 210/737 |
| 3,272,740 | 9/1966 | Gitchel et al. .................... 210/181 |
| 3,346,393 | 10/1967 | Bradford .................... 210/737 |
| 3,936,375 | 2/1976 | Nettli .................... 210/711 |
| 4,163,009 | 7/1979 | Filstrup .................... 210/737 |
| 4,282,256 | 8/1981 | Evich .................... 210/710 |
| 4,668,391 | 5/1987 | Ottens .................... 210/181 |
| 5,030,359 | 7/1991 | Castrantas et al. .................... 210/737 |

FOREIGN PATENT DOCUMENTS

| | | |
|---|---|---|
| 0119987 | 9/1984 | European Pat. Off. .................... 210/710 |
| 2205312 | 8/1972 | Fed. Rep. of Germany . |
| 1564277 | 4/1980 | United Kingdom . |
| 84101884 | 5/1984 | World Int. Prop. O. . |

Primary Examiner—Peter Hruskoci
Attorney, Agent, or Firm—Blakely, Sokoloff, Taylor & Zafman

[57] ABSTRACT

According to the process the sludge is homogenized and heated to 30°-60° C. temperature. The heated sludge is circulated under 2-4 bar overpressure, and its temperature is raised to about 130°-150° C. in 1-2 sec by conducting steam of 130°-151° C. and 2-4 bar pressure directly into the sludge, thus granulation is brought about in the sludge. The sludge of increased temperature —while its temperature and pressure maintained—is further circulated for about 60-300 sec. Then, the sludge is adiabatically expanded in 1-2 sec by reducing the pressure to about 0.01-0.02 bar. The expanded sludge is separated to water, fat containing water and solid impurity and wet solid phase containing protein.

It is characteristic to the apparatus that it is provided with device for heating the sludge, and pipe (18) for passing on the heated sludge connected with the heating unit (5) where an expansion valve is built in. Pipe (22) joining the separating tank (7) is connected with the expansion valve (6). The apparatus is provided with separator for separation of the sludge leaving the tank (7) to water, fat and solid phase.

14 Claims, 3 Drawing Sheets

PROCESS AND APPARATUS FOR EXTRACTION OF SOLID MATTER CONTAINING FAT AND/OR PROTEIN FROM SLUDGE

The invention relates to a process and apparatus for extraction of fat (pure industrial grease) and/or wet solid matter—especially solid matter containing protein—from sludge and/or waste water, particularly from the sludge of slaughterhouse.

The proportion of wastes and by-products derived from meat processing, as well as the water utilization relative to the live weight of the animal to be slaughtered is fairly large. Consequently the amount of industrial (slaughterhouse) waste water is also significant, this however—in contrast to several other kind of waste waters—represent not only environment protection problems, but is valuable fat and protein content is regarded as utilizable special slaughterhouse waste. Purified industrial grease and meat meal for feeding can be extracted from these waste waters.

Industrial waste waters and other wastes of the meat industry are derived from slaughtering animals, preparation of skin, emptying the rumen, stomach, intestines, meat and fat processing and transport of animals. Characteristic data of the industrial waste waters produced in the Hungarian meat industrial enterprises are the following:

| | |
|---|---|
| quanity of industrial waste water | 1000–4000 m$^3$/day |
| pH | 6.5–8.0 |
| KOI (chemical oxygen requirement) | 1000–20000 mgO$_2$/dm$^3$ |
| CCl$_4$ fats (organic solvent extract) | 500–800 mg/dm$^3$ |
| settling solids | 1000–2500 mg/dm$^3$ |
| solids passing through sieve | 150–300 mg/dm$^3$ |
| distribution of settling solids passing through sieve: | |
| waste containing protein | 50–90 mg/dm$^3$ |
| fibrous material (e.g. straw, etc.) | 100–210 mg/dm$^3$ |

Various technologies and apparatuses were developed for the treatment of industrial waste waters of the slaughterhouse. According to a most frequently used solution, the collected industrial waste water is filtered through sieve, the lumpy solids retained on the sieve are mixed with wastes derived from elsewhere, and meat meal is produced from the mixture. The waste water flowing through the sieve is conducted into aerated fat trap, and from there the fat with air drops to the water surface. Then the fat is mechanically removed with continuous dredging and carried off for processing.

The partly degreased waste water is conducted to reactor where calcium hydrate suspension and iron(II) sulfate are mixed to it. Under the effect of these chemicals and air, flocculation takes place in the waste water, and floccules develop in the course of mixing. The chemical purification taking place in the reactor is the following: under the effect of lye the water-fat decompose and the fat particles present as colloids and other floating matters become adsorbed in the large Fe/OH/$_3$ floccules.

The waste water passes from the reactor (flocculator) under overpressure into the stationary flotation machine. Here compressed air exceeding the atmospheric pressure is conducted into the waste water, then the overpressure is stopped. Tiny air bubbles ascend to the surface entraining the sludge floccules, thereby separating the sludge and water phases. In the course of above process, water content of the sludge is substantially reduced. For further dewatering, the sludge is continuously drained from the flotated waste water. The purified waste water is discharged into the public canal, or biological waste water treatment tank.

In some apparatuses the chemical sludge developed during treatment is fed into pressure filter for dewatering, and the sludge obtained by filtering is used either as compost in the agriculture, or—if unsuitable for this purpose—collected in sludge dump for annihilation. But, because of the chemical treatment, the possibility of using sludge as basic material of feed is excluded.

There are some processes where ligno-sulfonic acid is used as flocculent. Though the so-treated sludge was used earlier as basic material of feed, but recently the use of sludge for feeding animals can be sold at best as compost, or annililated at high cost.

According to another well-known solution, the waste water of the slaughterhouse is prefiltered through arc sieve and the liquid phase is flotated with air. No chemical treatment is required, and as a result of merely mechanical treatment the total fat is brought into foam phase floating on the liquid surface in the apparatus. The foam—besides fat—contains protein-based materials. The supernatant foam phase is continuously removed with scraper from the apparatus. The foam phase—owing to its high fat content—cannot be used (at least not directly) as the basic material of meat meal, it is generally stored and annihilated. This process is regarded only as environment protective waste water treatment method.

In sum, it can be established that the processes presently used for separation of the polluting components (fat and solids of heterogeneous composition) of the industrial waste water of the slaughterhouse are costly, the end-product (sludge, foam) is not valuable, the necessity of carrying off, storage and annihilation increase the cost of treatment.

The invention is aimed at the realization of a process and apparatus for treatment of industrial waters, especially those of the slaughterhouse including the processing of waste, which enable rationally the extraction of valuable components, such as fat and other solids with protein content for further utilization, in particular the fat in pure condition and the solids in dry granular form to be used as meat meal.

The invention is based on the recognition that if the homogenized sludge containing fat previously heated to at least 30° C. is put under pressure exceeding the atmospheric pressure, then heated instantly by direct steam inlet to at least 130° C. and held at this temperature for a short time—while circulating further—, the slurry will become granulated and sterilized. If thereafter the hot slurry under overpressure is adiabatically expanded to atmospheric pressure, the obtained material can be separated with conventional methods, e.g. centrifuging to three phases, i.e. water, fat and solid phase of heterogeneous composition, but containing large quantity of protein.

The water and fat containing some solid impurities can be purified further to highly pure industrial grease and sold as such, while dry, granulated meat meal can be produced from the wet solid phase containing protein as the basic material of feed.

Based on above recognitions, the problem was solved according to the invention with a process when the sludge is subjected to phase separation and which is characterized by the following:

the sludge is homogenized and heated to 30°-60° C., the heated sludge is circulated under 2-4 bar pressure and by injecting steam of 130°-151° C. of 2-4 bar pressure into the sludge, its temperature is raised to about 130°-150° C. in 1-2 sec, whereby granulation is produced in the sludge, the sludge of increased temperature—holding its pressure and temperature—is circulated further for about 60-300 sec, next, the sludge is adiabatically expanded for 1-2 sec by reducing the pressure to about 0.01-0.02 bar, the expanded sludge is separated to water, water containing fat and solid impurity; and wet solid phase containing protein.

It is stressed that in terms of the present invention, the "waste water sludge" is to be interpreted in the widest sense, i.e. beginning from the totally diluted materials to the densely liquid sludges, the processing of sludge and suspension of any consistency is included in the protective circle of the invention.

According to a preferred invention criterion, sludge is formed from foam obtained as waste water supernatant with appropriate flotation, and this sludge is subjected to further treatments, it is advisable to transform the foam to sludge with circulation leading to homogenization.

The apparatus according to the invention is provided with sludge circulator and phase separator, and it has a unit for heating the sludge and pipe to carry the heated sludge connected with the heating unit joined by steam pipe, a pipe with expansion valve emerges from the heating unit and a pipe joining the tank is connected with the expansion valve, and the apparatus has a separator for separating the sludge leaving the separating tank to water fat and wet solid phases. A preferred embodiment of the apparatus is characterized by a tank for receiving and homogenizing the untreated sludge connected with recirculating pipe or pipes containing pump and heat exchanger, and the pipe joining the heating unit starts out of the recirculating pipe connected with the heat exchanger. According to another embodiment given by way of example, the heating unit constitutes an injector-like device surrounded by curved surfaces expanding in the flow direction and ensuring directional deviation, one or several steam pipes lead to the vicinity of its inlet, and outlet of the latter one(s) is in the plane of the heating unit's wall. It is also preferable when the expansion valve is formed by a rigid pipe piece and a flexible pipe piece within, and compressed air pipe joins the space between the rigid and flexible pipe pieces, and the separating tank is cylindrical on the top and tapered at the bottom, pipes for steam and sludge start out of the upper part and lower parts respectively, furthermore, if the device separating the water, fat and wet solid phases leaving the separating tank is a self-discharging screw centrifuge.

According to an another preferred embodiment, one or several separator(s) is/are available for separation of water and impurity from the fat phase containing water and solid impurity. Several separators improve the degree of purification. Another embodiment of the apparatus would also be to advantage, where one or several devices are provided for solidification of the fat consisting of water, impurity and fat, and for its separation from water and impurity, then for melting the solidified fat. Finally it serves the purpose if the apparatus is provided with a device for drying the granulated wet solid phase containing protein.

BRIEF DESCRIPTION OF THE DRAWINGS

The invention is described in detail with the aid of drawings showing a preferred embodiment of the apparatus and some structural details, in which.

Figure 1:
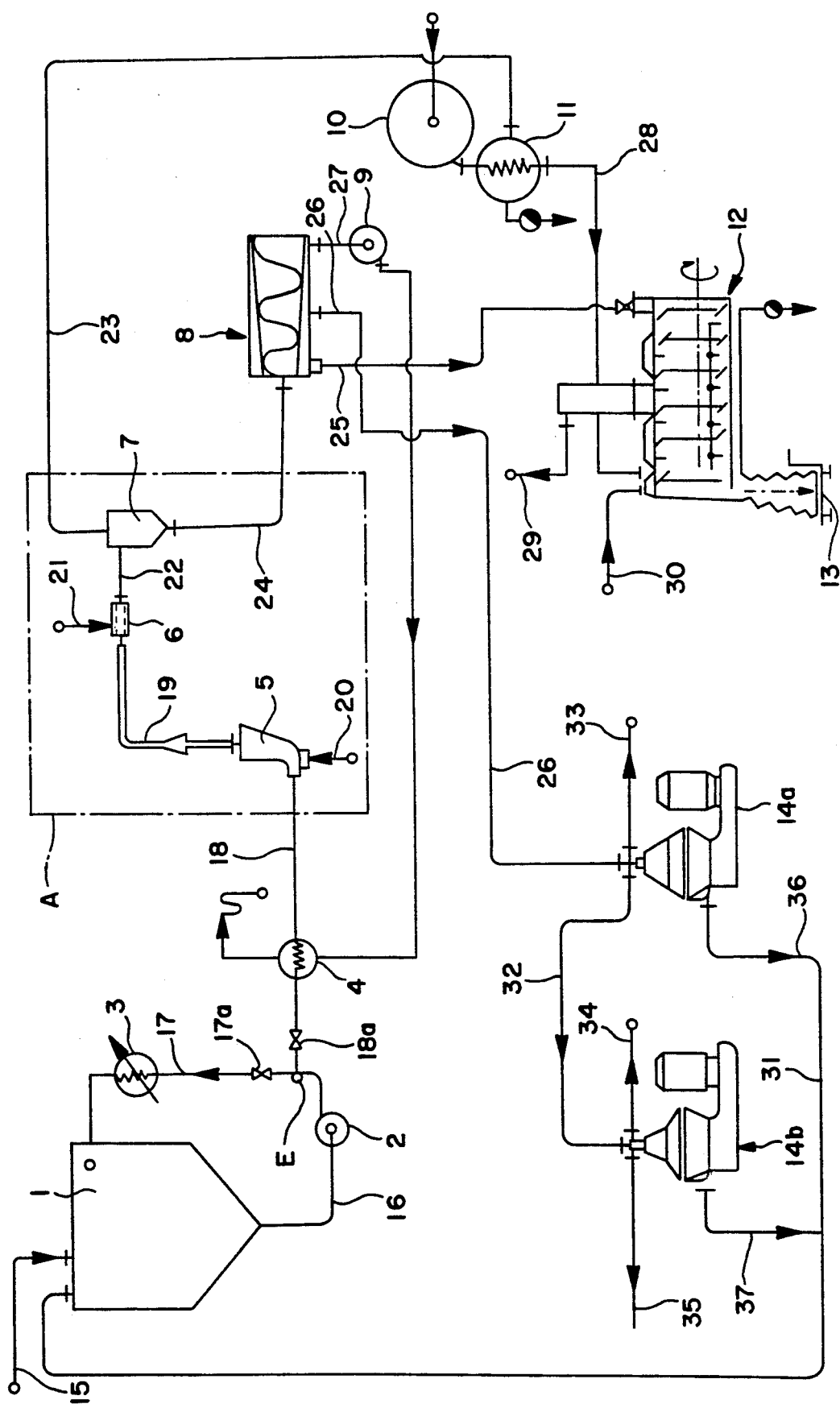
FIG. 1.: Schematic side view of the apparatus.

Pipe 15 for inlet of the sludge or foam phase joins the tank 1 on the top, said tank being tapered at the bottom. Pipe 16 containing pump 2 emerges from the lower part of tank 1. Pipe 16 is connected with recirculating pipe 17 and pipe 18 joining the upper part of tank 1. Heat exchangers 3 and 4 are built into pipes 17 and 18 respectively, and valves 17a, 18a are built in between the branch point and heat exchangers.

Pipe 18 joins the heating unit 5 connected with steam pipes 20. Pipe 19 emerging from heating unit 5 performs heat holding function, and an expansion valve 6 is built at its end, joined by compressed air pipe 21. Pipe 22 starting from expansion valve 6 joins the upper part of separating tank 7 tapered at the bottom, and pipes 24 and 23 emerge from its lower and upper parts respectively (see FIG. 2). The former one joins the decanter 8 formed by the three-phase screw centrifuge, and the latter one joins the calorifer 11 connected with fan 10.

It is noted, that the arrows drawn on the previously mentioned and subsequently described pipes indicate the flow direction of the mediums.

Three pipes emerge from decanter 8. Pipe 27 containing pump 9 joins the heat exchanger 4 built into pipe 18. The second pipe 26 is connected with first separator 14a, and pipe 25 with drier 12 provided with bagging unit 13. (It is advisable to use a contact-fluid drier described in the Hungarian patent specification No. 186 674.) Pipe 28 starting from calorifer 11 and steam pipe 30 join the drier 12 on the top, and air pipe emerging from it is marked with reference number 29.

The first separator 14a is connected with the second separator 14b through pipe 32. Pipe 33 emerging from the first separator 14a serves for removal of the separated water phase, and pipe 36 for removal of the sludge phase, while no pure fat passes through pipe 32 into the second separator 14b, from which pipes 34, 35 and 37 emerge. The first, second and third pipes are used for removal of the water, pure fat and sludge respectively. Pipes 36 and 37 are connected with pipe 31 joining the upper part of tank 1. (Said separators are conventional disc-type self-discharging devices.)

The earlier mentioned heating unit 5 (instant heater) in this case is an injector-type particular device, i.e. it has no consecutive narrowing-straight-expanding sections, and the slurry moves on at a directional deviation of 90° following its inlet instead of straight flow. The steam does not pass into the slurry through nozzle mounted in the circulating space (as usual in the known injectors), but through steam pipe 20 of small cross section connected with the outer arc of 90° (preferably more than one steam pipe is used), the inlets of which are along a 90° arc in the outer plane of the apparatus' wall, thus the steam pipes 20 do not reach into the flowing liquid. Dimensions (diameter, length of pipe) of the steam pipe 20 (steam inlet pipes) are selected so that upon stopping the heat treatment, the solid particles of the back flowing sludge should not cause clogging under the effect of instantaneous vacuum, and the process should be restarted without any purification. To prevent deposits, the heating unit is developed without dead space and structural parts obstructing the flow.

Figure 2:
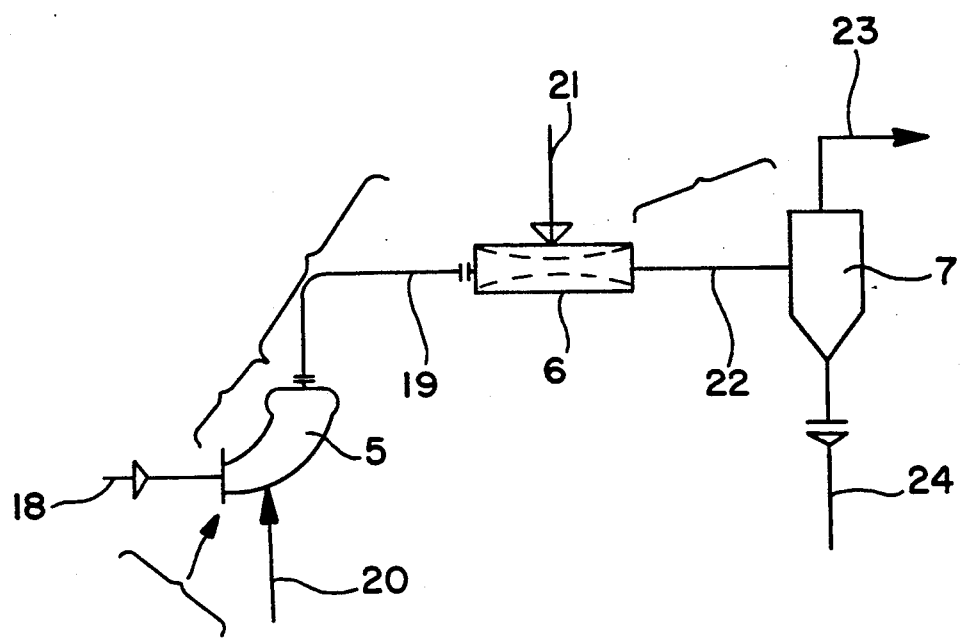
FIG. 2.: Detail "A" marked in FIG. 1 drawn to a larger scale.
Figure 3:
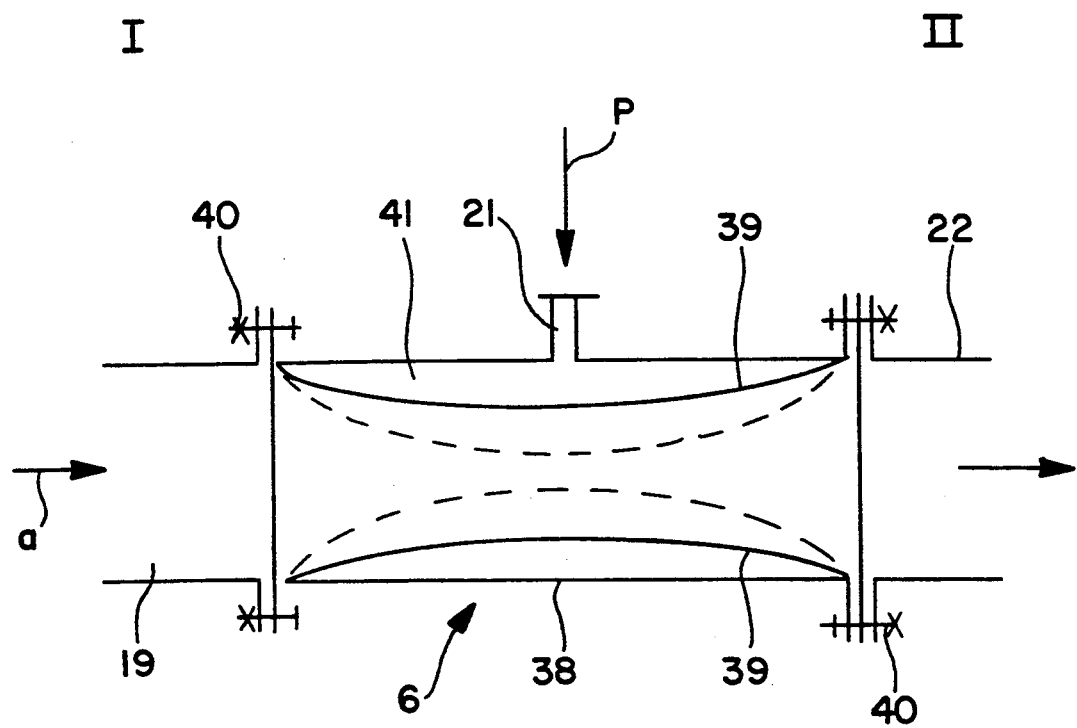
FIG. 3.: A preferred embodiment of the expansion valve drawn to a larger scale.

A preferred embodiment of the expansion valve 6 according to FIG. 1. and 2. is drawn to a larger scale in FIG. 3. It is a flow regulating, pressure relieve valve without valve seat and valve collar, the slurry flows in it without directional deviation along a straight line, there are no flow disturbing elements, slack spaces. FIG. 1-3. clearly show that the expansion valve 6 is between pipes 19 and 22, and it consists of a rigid pipe piece 38 and a flexible pipe piece 39 fixed in it (see FIG. 3), whereby flow of the slurry can be easily and simply regulated. Flanges of the flexible pipe piece 39 at the ends are clamped between the end flanges of rigid pipe piece 38 and flanges of the adjoining pipes 19, 22 are fixed with screws 40. The compressed air pipe 21 joins space 41 between the rigid pipe piece 38 and flexible pipe piece 39. Dashed line and relationship $d^x < d$ indicate in the drawing that under the effect of compressed air admitted through compressed air pipe 21, the cross section of flexible pipe piece 39 is reduced, thereby the medium entering from the direction of arrow a moves to a position of higher pressure in relation to the inlet cross section, thus as a result of chocking, the pressure rises in the pipe piece 39. Further flow direction of the medium is marked with arrow b. Owing to the above described construction of expansion valve 6, the coagulated parts present in the slurry cannot block the valve, the pressure is regulated simply by changing the pressure of the compressed air. Pressure of the compressed air is higher by about 0.2-0.3 bar than the 2-4 bar pressure developing in the heat holding pipe 19, i.e. 2.2, 2.3-4.2, 4.3 bar will be the pressure in the valve.

It is fundamentally important requirement for the heat holding pipe 19 (FIG. 1. and 2.) that deposit causing dead space must not be in it.

The upper part of separating tank 7 adjoining the expansion valve 6 with a short pipe 22 is cylindrical, while its lower part tapered, and pipe 22 used for feeding in the four phase slurry tangentially joins the upper third of the cylindrical part. Pipe 23 is used for discharge of the steam liberated in separating tank 7, while the three phase sludge leaves through pipe 24. Dimensions of the separating tank 7 and asjoining pipes are selected as to prevent overpressure in the separating tank 7 during operation.

Operation of the apparatus according to FIG. 1-3. is the following:

the supernatant foam phase obtained from the centrally—in the slaughterhouse—collected sludge and/or waste water treated with flotation process is conducted through pipe 15 into the tank 1. The foam phase is inhomogeneous, because its composition and thus its characteristic parameters considerably vary in time, as well as they are dependent on the place of origin of the industrial waste water. Since this inhomogenity adversely affects the denaturation, sterilization, the three phase sludge—foam containing fat, water and heterogeneous dry matter has to be homogenized in such a way that "foam break" should occur, i.e. the air flows out of the system. By breaking the foam, a three phase material of sludge consistency is obtained.

The homogenization is performed by dividing the quantity of slurry circulated in pipe 16 with pump 2 at branching E marked in FIG. 1., so that 70-90% of the sludge is recirculated through pipe 17 into tank 1, while its smaller part (30-10%) is conducted through pipe 18 into the heating unit 5. Homogenization by recirculation entails breakage of the foam phase.

The sludge has to be heated for further treatment with heat exchanger 3 built into pipe 17. The slurry is kept at 30°-60° C., preferably at about 40° C. temperature in tank 1 and pipes 16, 17 with heat transfer.

Temperature of the sludge passed on to heating unit 5 is raised to 30°-65° C., preferably to about 60° C. and temperature of the slurry arriving through pipe 18 is held with the aid of heat exchanger 4 built into pipe 18. In this case, the 70°-90° C. water leaving the three phase decanter 8 is fed with pump 9 through pipe 27 and this way the hot water passing out is cooled down—while its heat is utilized—prior to draining into the public canal.

The pump 2 moving the sludge, functions according to the principle of volumetric displacement, e.g. screw pump. The heat exchangers 3, 4 should be easily cleaned, the laminated heat exchangers are best suited this purpose.

The most important part-units of the apparatus are shown in FIG. 2. The sludge enters the heating unit 5, developed as a special injector at 30°-65° C. and under 2-4 bar pressure, where phase I of the heat treatment according to the invention, i.e. the "instant heating" takes place. The 2-4 bar pressure is set with expansion valve 6.

Composition and characteristic technical data of the three phase slurry (sludge) are the following: the slurry consists of liquid fat, hot water containing dissolved proteins and dissolved organic matters, as well as heterogeneous solids the main components of which are floating solids with protein content, floating organic solids (e.g. straw), and floating inorganic solids. The microbic composition of the 30°-65° C. sludge is of mixed population (vegetative cell, spore), the order of magnitude of its initial living microbe concentration is $$N_o = 10^8/ml^{-1} \text{ each.}$$

Heat treatment of the homogenized and heated sludge is aimed at coagulation of the total heterogeneous solid floating parts and at least partly the protein containing materials dissolved in water to treatable granular solid matter, on the other hand to reduce considerably the number of microbes by sterilization of the total mass of slurry including the complete destruction of the pathogenic microbes.

In phase I of the heat treatment, 130°-151° C., preferably about 140° C. saturated steam of 2-4 bar pressure is conducted to the 30°-65° C. sludge of 2-4 bar overpressure flowing in the heating unit 5 through steam pipe 20 joining the heating unit 5 in the vicinity of its inlet. Thus, the heat transfer takes place in the material itself instead through the wall, in the course of steam condensation (instant heat transfer). As a result of the partial condensation of the saturated steam (instant heating, or instant heat transfer) temperature of the slurry rises to 130°-150° C. in 1-2 sec, namely, the flow velocity of the sludge is set to stay in the heating unit 5 for 1-2 sec. Thus the steam inlet is continuous and by regulating the flow velocity of the sludge, the temperature rise to 130°-150° C. takes place in unit sludge volume in 1-2 sec. The 2-4 bar overpressure in the interior of heating unit 5 is more than necessary to heat the sludge to about 140° C., the non condensated surplus steam flows further with the sludge in the form of bubbles. Coagulation of the solid phase in the sludge takes place in the course of above described heat treatment.

In the wake of the steam bubbles present in the heating unit 5, four-phase sludge develops as follows: water, fat, heterogeneous granular material and steam bubble.

Phase II of the heat treatment takes place in heat holding pipe 19 where the sludge stays under 2-4 bar overpressure and at 130°-150° C. temperature for 30-300 sec. The length of pipe 19 is selected as to ensure the 30-300 sec residence time in it with regard to the flow velocity of the sludge. As a result of heating holding, the coagulation and sterilization of the sludge are accomplished. Thus, as a result of heat treatment in phase I and II, part of the heterogeneous floating parts and protein-containing materials become coagulated, and so they can be filtered. Since the sterilization extends to the total mass, the number of microbes in the slurry is substantially reduced (the final living microbe concentration of the slurry drops to the value of $$N=10^2-10^3/\text{ml}^{-1} \text{ each,}$$

while all pathogenic microbes are completely destroyed). The steam bubbles are present in the sludge further on, thus the four phases remain. Size of the coagulated solid grains in the sludge may approach—in extreme case—the inside diameter of heat holding pipe 19, and the coagulated grains retain their original shape even after sterilization.

Phase III of the heat treatment, the adiabatic expansion takes place in pipe 22 extending from the expansion valve 6 to the separating tank 7, and also in the separating tank itself in such a way that while the sludge flows into the separating tank 7 of atmospheric internal pressure, its 2-4 bar overpressure drops to 0.01-0.02 bar, and its temperature to 93°-103° C., generally to about 100° C. The expansion takes place instantaneously in 1-2 sec. The non condensed steam in the slurry, and the so-called aftersteam liberated under the effect of pressure drop are conducted through pipe 23—starting from the upper part of separating tank 7—into the calorifer 11, where the air blown in by fan 10 is preheated in drier 12.

The above described phases I-III of the heat treatment are performed always in continuous operating mode.

As mentioned before, under the effect of heat treatment the number of bacteria is substantially reduced, the pathogenic bacteria are completely destroyed, at the same time the experiments and tests proved that some protein becomes accessible, thereby the digestable protein content of the solid matter obtained after heat treatment is increased. It was also found that the instant heating and sterilization of the slurry did not alter the extracted industrial grease either in physical or chemical sense, that is, it did not cause deterioration of the quality and the same applies to lisine as one of the fundamental components of meat meal: it did not become inactive during heat treatment, lisine content of the solid matter did not suffer damage (heat sensitivity of the lisine in the meat meal is not significant).

Returning to FIG. 1.: the valuable materials of the degerminated three phase slurry (water, fat, heterogeneous granular solid matter) leaving the separating tank 7 through pipe 29 are extracted as follows:

the sludge of at least 90° C. temperature is conducted from the separating tank 7 through pipe 24 into decanter 8—in present case into three phase self-discharging screw centrifuge—where the sludge is separated to at least 90° C. hot fat and hot wet solid matter. As mentioned earlier, the hot water is fed through pipe 26 into separator 14a and the wet solid matter through pipe 25 into drier 12 for drying and granulation.

The hot fat arriving in the separator 14b contains about 20% water and 1% solid pollutant, and value of the purified industrial grease is decisively influenced by how successful is removal of the pollutants after treatment. According to the tests, the purification is most efficient in the centrifuge separators, suitably in self-discharging disc separator. To improve the efficiency of purification, the separation is performed in two stages: the mainly purified fat leaving the separator 14a is conducted through pipe 32 into the series-connected second separator 14b, from where the already completely purified liquid fat of higher than 30° C. is removed through pipe 35 and carried further for utilization as industrial grease. The hot water of at least 30° C. temperature flows from separators 14a, 14b through pipes 33 and 34 for example into the public canal, while the small quantity of sludge emerging from the separators' chamber from time to time is conducted through pipes 36, 37 into pipe 31 then back to the tank 1.

Composition of the wet solid matter arriving from decanter 8 is heterogeneous: it contains granular organic and inorganic, as well as granulated protein-based solid components, about 60% water and about 13% fat. In drier 12—the so-called "contact-fluid" drier described in the Hungarian patent specification No. 184 674—moisture content of the solid matter is reduced to about 7%, and parallel with this, the granulation of solid matter is completed and further degermination takes place. Owing to the low moisture and fat content of the solid granular material poured into the bagging unit from drier 12, it can be stored over a long time, even for years, and—since its valuable protein content was not damaged in the course of treatment—the meat meal as basic material of feed is utilizable practically in unlimited quantity.

The process according to the invention described in the foregoing was based on the assumptions that the raw material fed into tank 1 for processing is flotated waste water supernatant foam. Obviously the process and apparatus according to the invention are suitable—besides the treatment of this material—for processing of non foamed fatty waste water as well. The fatty waste water (slurry) accumulated in fat trap shafts and collected with snifter trucks can be fed into tank 1 without foaming but the floating coarse mechanical impurities have to be filtered in advance, for example through arc sieve. Even in this case, the major part of slurry in the tank and through pipes 16, 17 is circulated with pump 2 shown in FIG. 1., and the slurry is held at 30°-60° C., preferably at about 40° C. temperature with ehat exchanger 3. Thereafter the slurry (waste water) is treated according to those described earlier in connection with FIG. 1-3.

Figure 4:
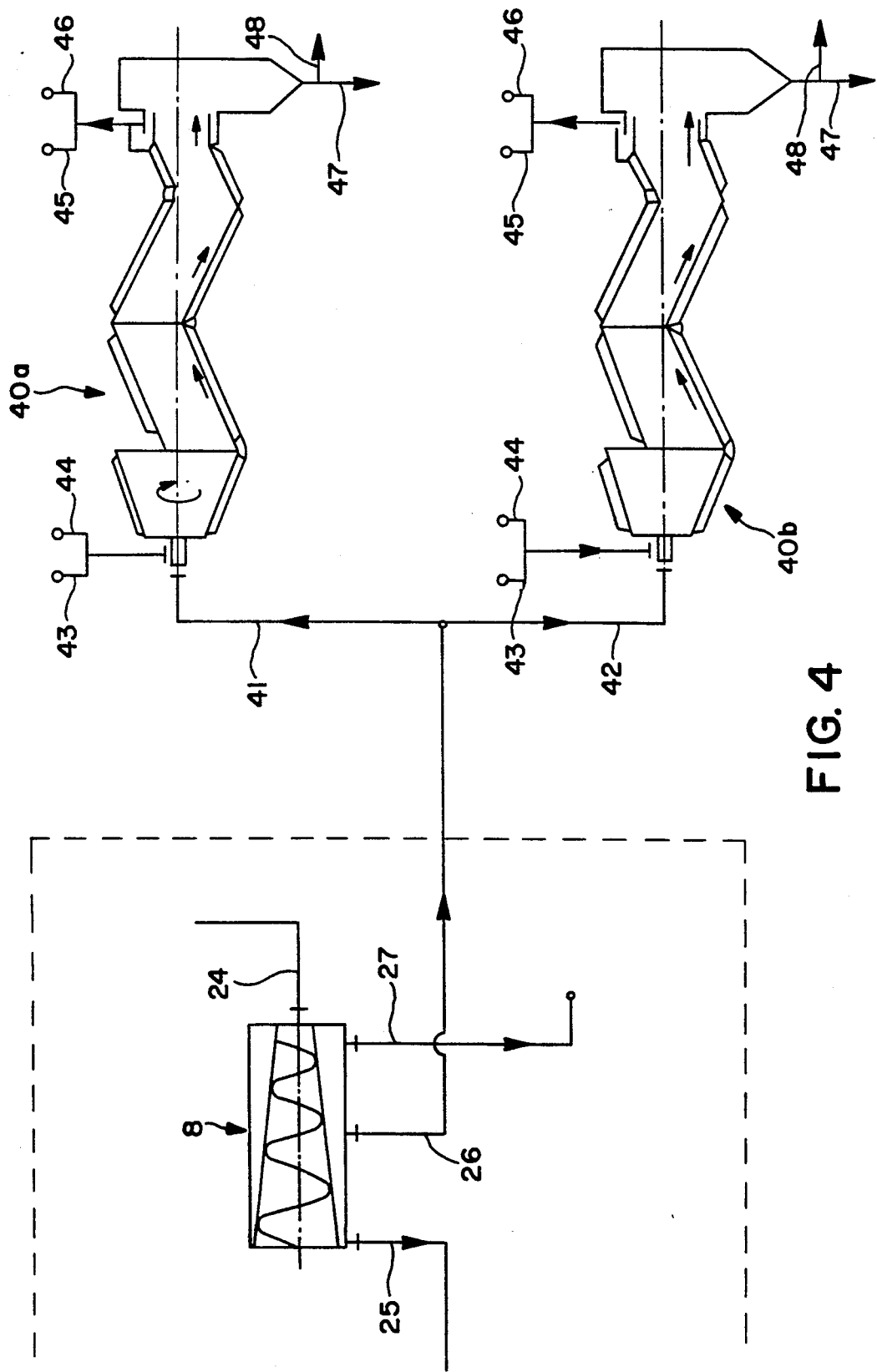
FIG. 4.: Detail of the apparatus showing parts different from those of FIG. 1.

Extraction of the fat is conceivable without the use of methods and apparatuses described in connection with FIG. 1., i.e. the use of self-discharging disc separators is not absolutely necessary. For example the about 90° C. hot liquid fat to be purified emerging from decanter 8 shown in FIG. 1. is cooled down to at least 10° C. temperature (or lower) in several steps in an apparatus where the frozen fat sticks to the wall of the apparatus, while the water together with the solid polluting components leaves the system. Then, the frozen fat stuck to the wall of the apparatus is heated to at least 40° C., and the so-obtained pure industrial grease is carried to its place of destination. Various apparatuses can be used for the combined process of freezing and heating, such as for example drop-film freezing and heating in vertical tubular apparatus. Pipe of optional position can be used with screw-type forwarding mechanism built in for carrying the materials and to obtain fat-film. Finally the best solution may be that shown in FIG. 4., where the earlier described apparatus parts were marked with the same reference numbers applied earlier. The coolers heaters 40a,40b represent the subject of Hungarian patent specification No. 184 672, their detailed description is unnecessary. FIG. 4.—as follows from the presence of the two cooler heater 40a,40b—includes a continuously operating apparatus. When freezing takes place in the cooler-heater 40a (cold water is admitted into the apparatus), heating is performed in the cooler-heater 40b, then the cycles are reversed, thus the fat extraction is continuous. If the apparatus has only one cooler-heater, the operation is intermittent, freezing and heating take place cyclically alternating in the same apparatus.

Pipes 41, 42 branched off from pipe 26 (see FIG. 1.) are connected with cooler-heater 40a, 40b of the apparatus according to FIG. 4. The heat carrier medium used for freezing and melting is cold or hot water conducted into a double mantle, pipe 44 is used for freezing in the former one and pipe 43 for the latter one. The hot water functioning as heat carrier medium leaves the cooler-heater 40a, 40b through pipe 45, while the cold water through pipe 46. The water separates from the melted fat and leaves through pipe 47, while the pure (industrial) grease is discharged through pipe 48.

The invention is described by way of examples as follows:

EXAMPLE 1

The sludge centrally collected in the slaughterhouse and the flotated waste water foam produced in the course of waste water treatment are collected in a 10 m$^3$ storage tank with sloped bottom. The inhomogeneous sludgefoam phase is homogenized by recirculation accomplished with mixing-crushing pump the delivery capacity of which exceeds at least three times the volume of the storage tank and this way the foam phase is broken.

The homogenized fatty waste water sludge is pressed with rubber lined pump under 2.5 bar pressure and at 800 l/h feeding rate into an injector-like heating unit, where it is heated to 130° C. temperture with the continuous admission of saturated steam. The multiphase material leaving the heating unit is held at this pressure and temperature for 180 sec, meanwhile it is continuously circulated in a heat insulated pipe section to an expension valve. As a result of this heat treatment, a certain part of the homogeneous components and materials containing protein are coagulated and thus: become filterable and the total mass of the sludge is sterilized, resulting in considerable reduction of the number of microbes including total destruction of the pathogenic microbes.

The heat treated sludge passing through the expansion valve under 4 bar outside pressure flows into a 200 liter separating tank containing mixer and under atmospheric pressure. Here takes place the adiabatic expansion of the sludge when the liberated steam leaves through the upper part of the tank. The hot, about 100° C. sludge is poured into self-discharging screw centrifuge. Here 100–150 l/h fatty supernatant and 30–50 kg wet solid phase are obtained from the about 100 l/h hot sludge. 15–20 kg/h meat meal can be produced from the latter one in the drier, and 80–100 kg/h industrial grease from the fatty supernatant phase with separators in a two-step system.

EXAMPLE 2

The fatty waste water accumulated in fat trap shafts is collected with snifter truck and—the material freed from coarse impurities by preliminary filtering—is passed into a 10 m$^3$ storage tank. The material—already diluted sludge—homogenized with circulation using mixing-crushing pump is admitted into an instant heating unit under the same pressure and rate described in Example 1, where it is heated to 130° C. with saturated steam in continuous operating mode. The multi-phase material leaving the instant heater is held at this temperature for 180 sec. As a result of heat treatment, a certain part of the floating components become filterable, coagulate and the materials containing protein become filterable, the total mass of sludge (slurry) is sterilized, the number of microbes is reduced and the pathogenic microbes are completely destroyed.

The heat treated sludge (slurry) consisting of fat, passed through the expansion valve is conducted tangentially into a 30 liter separating tank, where the 2.5 bar pressure—with adiabatic expansion—drops to atmospheric pressure, and its temperature will be about 100° C. The liberated steam leaves through the upper part of the tank.

The three phase sludge (slurry)—consisting of fat, water and solid granular material—emerging from the separating tank is separated on three phase screw decanter. The blood free from sedimentary material can be drained instantly into the canal (about 600 l/h). A solid wet phase (max. 50 kg/h) is mixed with the other wastes of the slaughterhouse. The about 350 l/h fatty phase after purification in two steps with hot water and separator, and weighing (150–200 l/h) is put into industrial grease storage tanks.

Benefits of the invention are the following:

the invention enables the treatment of waste waters derived from the slaughterhouse as special slaughterhouse wastes and its processing to industrial grease and protein feed for animals. The process and apparatus make the slaughterhouse waste water as environment polluting factor harmless, well utilizable valuable materials are extracted, thus the waste water treatment becomes economic as no chemical treatment is required. The technical and economic problems associated with further treatment of the foam phase are also solved.

Naturally the invention is not restricted to the above described concrete solutions, but it can be realized in several ways within the protective circle defined by the claims.

We claim:

1. A process for the extraction of one or both of fat and protein containing material from waste water sludge, the process comprising the steps of:
   circulating the waste water sludge in a circulating tank;
   heating the waste water sludge to a temperature of 30°–60° C.;
   pressurizing the waste water sludge to a pressure of 2–4 bar;

supplying the waste water sludge to a heating unit;

heating the waste water sludge to an increased temperature of approximately 130°-150° C. in 1-2 seconds in the heating unit to bring about granulation in the waste water sludge;

holding the waste water sludge in a heat holding pipe connected to the heating unit for approximately 60-300 seconds while the pressure of 2-4 bar and the increased temperature of 130°-150° C. are maintained;

expanding the waste water sludge adiabatically in 1-2 seconds by reducing the pressure to approximately 0.01-0.02 bar using an adiabatic expansion valve connected to the heat holding pipe;

supplying the waste water sludge to a separating tank; and separating the waste water sludge into water, water containing fat and solid impurity and a solid phase containing protein in a three-phase screw centrifuge connected to the separating tank.

2. The process according to claim 1, wherein the process further comprises the steps of:

supplying the water containing fat and solid impurity from the screw centrifuge to a first separator to separate the fat and solid impurity from the water;

supplying the fat and solid impurity from the first separator to a second separator to further separate the fat and solid impurity from any remaining water to obtain industrial grease.

3. A process according to claim 1, wherein the process further comprises the steps:

supplying the solid phase containing protein from the screw centrifuge to a drier;

heating the solid phase containing protein in the drier until a moisture content of the solid phase containing protein is reduced to approximately 7%; and granulating the dried solid phase containing protein into granules to be used as feed.

4. A process according to claim 1, wherein the process further comprises the step of forming waste water sludge with flotation from foam obtained as water supernatant.

5. The process according to claim 4, wherein the step of forming the waste water sludge with flotation from foam obtained as water supernatant is performed by circulating the foam which results in homogenization of the waste water sludge.

6. An apparatus for the extraction of one or both of fat and protein containing material from waste water sludge, the apparatus comprising:

a sludge circulator for receiving and circulating the waste water sludge;

a first heating unit coupled to the sludge circulator for heating the waste water sludge during circulation;

a first pipe for supplying the waste water sludge from the sludge circulator to a steam injection heating unit for rapidly heating the waste water sludge to an increased temperature of approximately 130°-150° C. in 1-2 seconds;

a second pipe for holding the waste water sludge from the steam injection heating unit at a pressure of 2-4 bar and said temperature, and supplying said sludge to an expansion valve means including a compressed air pipe for adiabatically expanding the waste water sludge by reducing said pressure to about 0.01-0.02 bar in 1-2 seconds; and a third pipe for supplying the waste water sludge from the expansion valve to a separating means for separating the waste water sludge into water, water containing fat and solid impurity and solid phase containing protein.

7. An apparatus according to claim 6, wherein the sludge circulator comprises a circulating tank for receiving and homogenizing the waste water sludge and a recirculating means having a first pump and the first heating unit coupled to the recirculating means for heating the waste water sludge upon recirculation, the recirculating means coupled to the first pipe for supplying the waste water sludge to the steam injection heating unit through a second heating unit.

8. An apparatus according to claim 6, wherein the steam injection heating unit comprises a curved surface juxtaposed to an incoming flow of the waste water sludge and a plurality of injection ports disposed about the curved surface through which steam is provided to deviate the incoming flow of waste water sludge.

9. An apparatus according to claim 6, wherein the expansion valve means comprises a flexible pipe piece within a rigid pipe piece for compressing a volume of waste water sludge within the flexible pipe piece by supplying compressed air to a space between the rigid pipe piece and the flexible pipe piece.

10. An apparatus according to claim 6, wherein the separating means comprises a separating tank having a cylindrical top portion with a first outlet pipe for passing steam and a tapered bottom portion with a second outlet pipe for passing the waste water sludge.

11. An apparatus according to claim 6, wherein the separating means further comprises a screw centrifuge for separating the waste water sludge supplied from the separating tank into the water, the water containing fat and solid impurity and the solid phase containing protein.

12. An apparatus according to claim 6, wherein the separating means further comprises at least one separator connected to the screw centrifuge for receiving the water containing fat and solid impurity and separating the water from the fat and solid impurity.

13. An apparatus according to claim 6, wherein the separating means further comprises a plurality of separators sequentially connected to the screw centrifuge for successively receiving the water containing fat and solid impurity and separating the water from the fat and solid impurity until industrial grease is obtained.

14. An apparatus according to claim 6, wherein the apparatus further comprises a drier connected to the screw centrifuge for receiving the solid phase containing protein and drying the solid phase containing protein for use as feed.

* * * * *

UNITED STATES PATENT AND TRADEMARK OFFICE
CERTIFICATE OF CORRECTION

PATENT NO. : 5,200,085
DATED : April 6, 1993
INVENTOR(S) : Rudolf, et. al.

It is certified that error appears in the above-indentified patent and that said Letters Patent is hereby corrected as shown below:

Title page, item [57], Abstract, col. 2, line 8, after "The sludge of increased temperature" the phrase and predicate "-while its temperature and pressure maintained-is further circulated for about 60-300 sec." should immediately follow, rather than begin at line 9.

Column 8, line 57, change "ehat:" to -- heat --.

Signed and Sealed this

Ninth Day of May, 1995

Attest:

BRUCE LEHMAN

Attesting Officer

Commissioner of Patents and Trademarks